United States Patent [19]

Aune et al.

[11] Patent Number: 4,879,752

[45] Date of Patent: Nov. 7, 1989

[54] LUMBER OPTIMIZER

[75] Inventors: Jan E. Aune; Terence J. Arden; Mary S. Yap, all of Vancouver, Canada

[73] Assignee: MacMillan Bloedel Limited

[21] Appl. No.: 122,336

[22] Filed: Nov. 18, 1987

[51] Int. Cl.[4] .............................................. G06K 9/78
[52] U.S. Cl. ...................................... 382/1; 209/517; 356/237; 358/106; 382/8
[58] Field of Search ........................... 382/1; 209/517; 356/237; 358/106

[56] References Cited

U.S. PATENT DOCUMENTS

| 3,931,501 | 1/1976 | Barr ..................................... | 235/151 |
| 3,942,021 | 3/1976 | Barr et al. ........................... | 83/371 |
| 4,541,011 | 9/1985 | Mayer et al. ........................ | 356/237 |

FOREIGN PATENT DOCUMENTS

| 1125148 | 6/1982 | Canada ................................. | 143/61 |
| 1146051 | 5/1983 | Canada ................................. | 143/61 |

OTHER PUBLICATIONS

"Theory of Edge Detection", D. Marr and E. Hildreth, MIT Artificial Intelligence Laboratory, Apr. 1979.
D. G. Miller, Detection of Rot in Wood by Electronic X-Ray Fluoroscopy, Oct. 1984, pp. 64–67.
Ryszard Szymani & Kent A. McDonald, Defect Detection in Lumber: State of the Art, Nov. 1981, pp. 34–44.
Fred W. Taylor, Francis G. Wagner, Jr., Charles W. McMillin, Ira Lon Morgan & Forrest F. Hopkins, Locating Knots by Industrial Tomography-A Feasibility Study, May 1984, pp. 42–46.
Brian V. Funt & Edwin C. Bryant, Detection of Internal Log Defects by Automatic Interpretation of Computer Tomography Images, Jan. 1987, pp. 56–62.
Richard W. Conners, Charles W. McMillin, Kingyao Lin & Ramon E. Vasquez Espinosa, Identifying and Locating Surface Defects in Wood: Part of an Automated Lumber Processing System, 1983, IEEE, pp. 573–583.
Charles W. McMillin, Richard W. Conners & Henry A. Huber, ALPS-A Potential New Automated Lumber Processing System, Jan. 1984, pp. 13–20.
Richard W. Conners, Charles W. McMillan, Ramon Vasquez-Espinosa, A Prototype Software System for Locating and Identifying Surface Defects in Wood+, IEEE 1984, pp. 416–419.

*Primary Examiner*—Leo H. Boudreau
*Assistant Examiner*—Yon Jung

[57] ABSTRACT

A lumber optimizer system that detects the wane in a flitch being processed and by using a plurality of discrete detectors detecting the amount of electromagnetic radiation passing through localized areas of the board to determine the local differences in density provides a density profile of the flitch. The developed data are accumulated as the flitch traverses the detectors and processed in a computer to provide a profile of signal strengths generated by the detectors and used to generate an image of varying intensity depending on the signal (density) for each discrete area of the flitch and provide a density map of the field. The map so produced is analyzed in conjunction with the detected wane to determine the defects in the flitch and the nature and the position of such defects in the flitch and provide a plan of the flitch wherein the locations of good wood, and various defects are provided. This plan is then used to determine the sawing solution for the flitch and to adjust the position of a positioning system to position the flitch for sawing in accordance with the sawing solution. The saws are also adjusted in accordance with the sawing solution and an overall control computer is provided to control asynchronous operation of the sensors, computers and adjusters to ensure that the operations of these units are controlled in accordance with the location of the flitch as it travels through the system. This system permits the determination of a sawing solution and the setting of the saws in a time span permitting realistic production rates from the system.

14 Claims, 3 Drawing Sheets

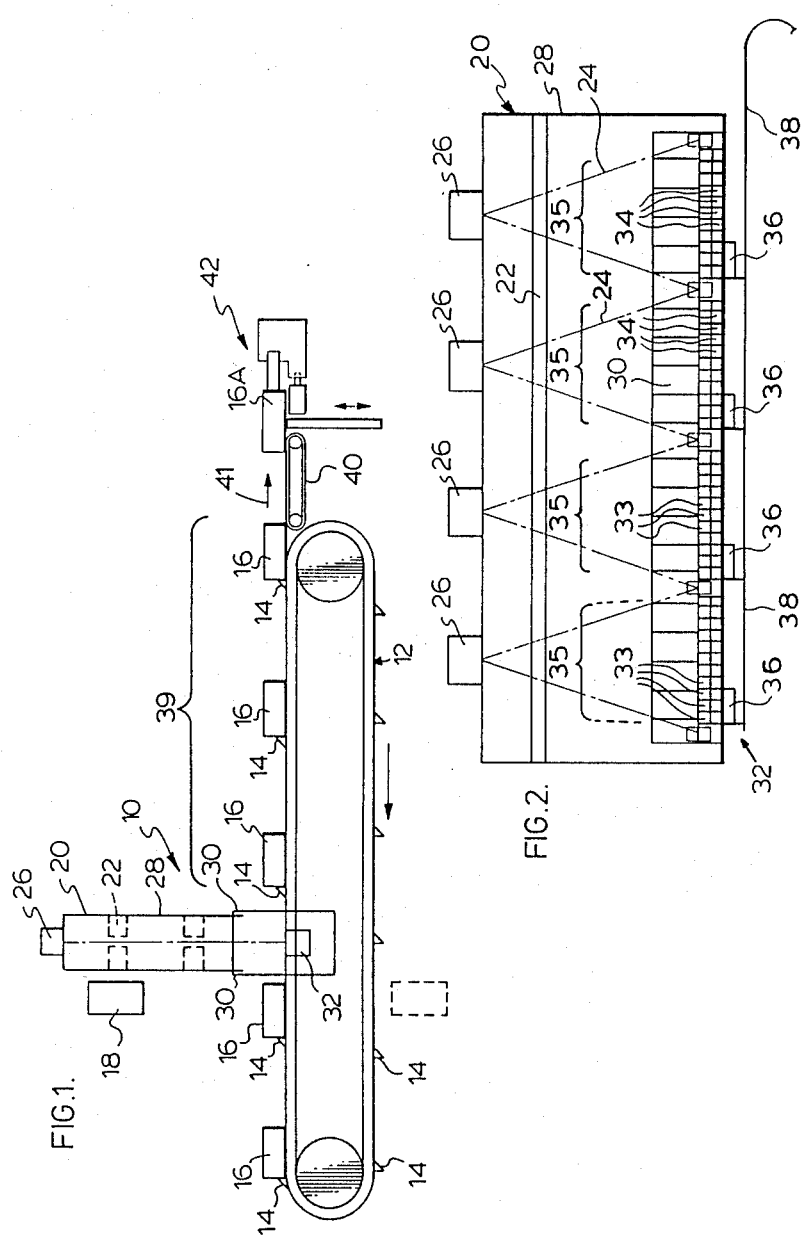

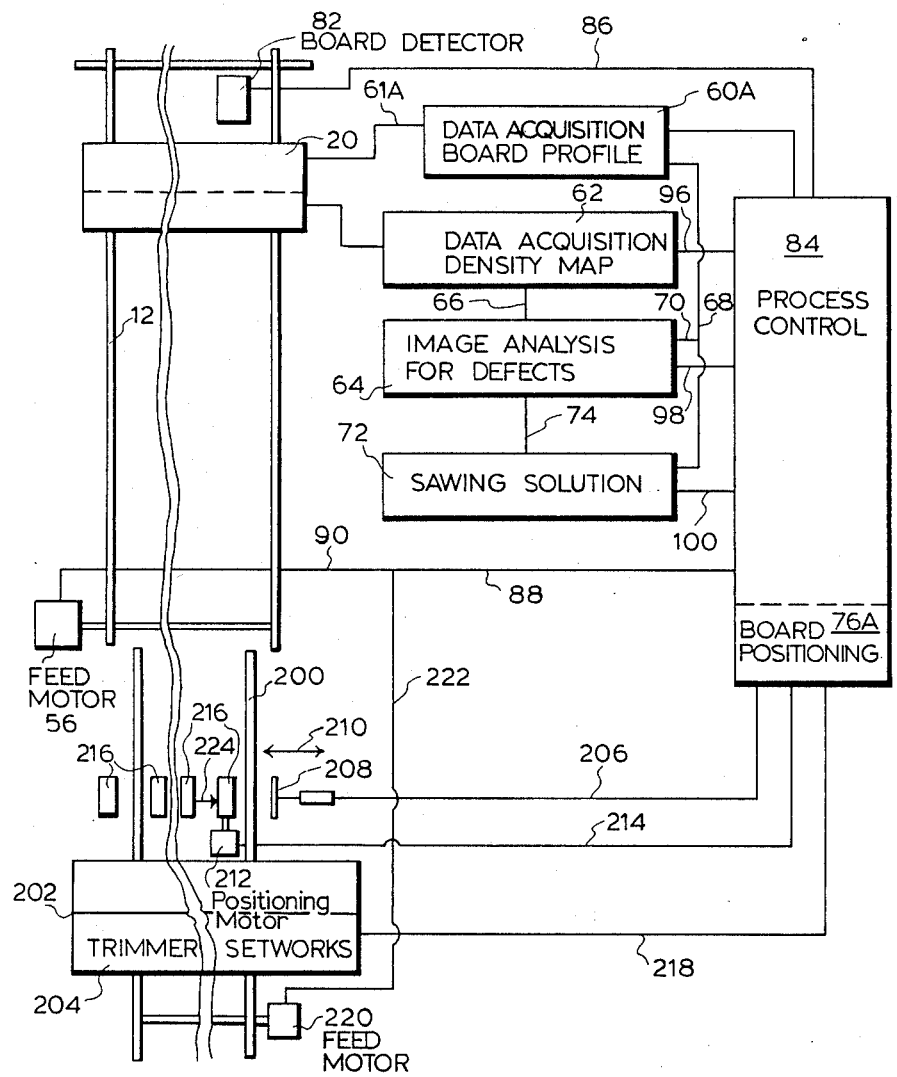

LUMBER OPTIMIZER

FIELD OF THE INVENTION

The present invention relates to a lumber optimizer, more particularly the present invention relates to a scanning system operated at real time to scan, develop an image and control the orientation of the board and position saws in accordance with an analysis of the image so produced.

BACKGROUND OF THE PRESENT INVENTION

The concept of analyzing wood using electromagnetic radiation has been suggested even well before any equipment capable of commercially utilizing such a concept was available, see for example, an article by D. G. Miller entitled "Detection of Rot in Wood by Electronic X-Ray Fluoroscopy" published in the British Columbia Lumberman of October 1964. The concept of using x-rays for detecting rot in wood was described as being old at that time and refers to an investigation as far back as 1929. The theory suggested that provided rot had progressed sufficiently to significantly reduce the density of the wood, the x-ray absorption would also be reduced. The article concludes that x-ray fluoroscopy provides a rapid nondestructive method of making internal inspections of wood for rot pockets and for metal.

An article entitled "Defect Detection in Lumber—State of the Art" by Szymani and McDonald in the November 1981 issue of Forest Products Journal, reviews the various techniques for analyzing board and logs. In relation to fluoroscopy, reference is made to the above article of Miller and to the real time x-ray, television and x-ray cinetography so that the images can be projected directly through a television network. Also described is a system where an x-ray sensitive device detects the amount of x-rays passing through the specimen and wherein by filtering and amplifying the signal, an indication of the presence or absence of defects could be provided and the output used via computer for lumber grading and sawing decisions. Particular attention is directed in this article to the Scintaflex System which directs, in this case neutrons at a point area on the board and senses the amount of radiation traversing the board to provide an indication of the density at the point.

Various techniques have been used or described to identify knots and/or rot in logs, for example, in the article "Locating Knots by Industrial Tomography—A Feasibility Study" by Taylor et al., published in the Forest Product Journal of May 1984 or in the article "A Computer Vision System that Analyzes CT-Scans of Saw Logs" by Funt and Bryant in a paper given at the IEEE Computer Society Conference on computer vision and pattern recognition.

Funt and Bryant have also published a paper entitled "Detection of Internal Log Defects by Automatic Interpretation of Computer Tomography Images" published in the January 1987 issue of the Forest Products Journal, which describes in detail the analysis of a log cross section histogram of a density map developed by a scan of a log using x-rays and the analysis of this histogram to determine the location of knots and rot.

Optical scanners have also been used to determine the location of surface defects in lumber by differentiating based on surface color.

Automatic lumber processing systems (ALPS) have also been described wherein the information derived from an optical scan of the board is analyzed based on tone, color, texture and pattern recognition to determine the location of surface defects in a piece of lumber and to use the information so generated to provide a sawing solution for sawing of the scanned board to obtain the optimum of recoverable lumber from the scanned board.

An article in IEEE "Transactions on Pattern Analysis and Machine Intelligence" Volume TAMI-5 No. 6 November 1983 entitled "Code Identifying and Locating Surface Defects in Wood—Part of An Automated Lumber Processing System" by Conners et al describes a system wherein an image is produced by optical scanning such as by means of a laser scan and then the image is examined to gauge its tonal properties, i.e. degree of brightness, its texture or pattern qualities and pattern recognition to detect defects in the lumber material and the position of these defects.

An article entitled "ALPS—Potential New Automated Lumber Processings System" by McMillin et al., in Forest Products Journal, Volume 34, No. 1, January 1984 deals with sensing and locating defects in a log and provides an optimum cutting solution based on this information. In this publication a log is processed by scanning using photon tomography and computer reconstruction of axial projections from three different angles to locate defects in the log. After sawing the log into boards, the boards themselves are scanned with video cameras and the image information digitized and analyzed for tonal and textural quality and an optimal cutting strategy based on the defect location is then implemented.

The article "A Prototype Software System Locating and Identifying Surface Defects in Wood" by Conners, given at the Seventh International Conference on Pattern Recognition in Montreal, Canada July 30-Aug. 2 1984 and published in the Proceedings Volume 1, provides further details on differentiating clear wood from defective wood in lumber utilizing optical scanning techniques wherein the background wane, knots and clearwood are distinguished.

U.S. Pat. No. 3,931,501 issued Jan. 6, 1976 to Barr et al discloses yet another scanning technique for determining and designating the surface defects on a piece of wood and then providing a cutting pattern for edging the wood into discreet lumber elements.

Canadian Pat. No. 1,146,051 issued May 10, 1983 to Strandberg et al describes a system for optimizing based on measuring the contours of a piece of timber and sawing based on an optimization program which positions the piece of timber for sawing in the edger and adjusts the edger accordingly.

Canadian Pat. No. 1,125,148 describes an optical sensor detecting irregularities along the lateral edges of a cant and adjusting the position of the cant for sawing to eliminate these irregularities.

It will be apparent from the above that a variety techniques have been suggested and provided in some cases for scanning boards to develop images of the surface of the board which are then analyzed first to determine defects and types of defects and location of these surface defects and then devise an optimum cutting solution for edging of the board and position the same for subsequent edging. These systems primarily utilize optical scanning techniques for providing the image to be analyzed, however it has been proposed to use in some cases electromagnetic radiation by directing a pinpoint of such radiation through the board and sensing the intensity of the radiation after it traverses the board to provide indications of the density.

Thus it is known in real time to provide analysis of a board and devise an optimum cutting solution, i.e. to analyze the images produced by scanning of the board in real time to determine the location of defects and from this generate an optimum cutting pattern. Such real time analysis have been based exclusively on optical scanning and analysis of the image so produced. However it will be apparent that optical scanning as such can determine only surface defects and in many cases is limited by the surface of the flitch being scanned so that the rough surface of a rough sawn flitch cannot be processed using this technique.

X-rays or electromagnetic detection techniques have been applied primarily to the analysis of the whole log rather than to a flitch or cant and the image (images) generated have been analyzed for defects and a cutting solution for logs. It has been suggested that x-ray tomography or fluoroscopy may be applied to detect defects in lumber. To date the published information relates to the use of x-rays to inspect wood and have not been of a practical nature, i.e. operated in real time (capable of operating at conventional production speeds).

BRIEF DESCRIPTION OF THE PRESENT INVENTION

It is an object of the present invention to provide a real time system for scanning a flitch to produce an image of the flitch based on density variation, analyze the image so produced and provide a sawing solution sufficiently rapidly to maintain reasonable mill production speed (real time).

Broadly the present invention relates to a lumber optimizer system comprising a conveyor means for transporting flitches through said system, a profiling means generating a signal defining the wane of each said flitch, a data acquisition station having means directing a line of electromagnetic radiation through each said flitch as it is moved by said conveyor means through said data acquisition station and means for locally sensing the amount of said radiation traversing each said flitch to provide data indicating the densities of local areas of each said flitch, means forming a density map from said data, image analysis means to analyze the density map and said signal to determine the size and location of defects on the density map, means for determining a sawing solution based on said image analysis and determination of defect size and location and said signal as determined by said profiling means, means adjusting a sawing means in accordance with said sawing solution so generated for each said flitch and means adjusting a flitch positioning means to position each said flitch relative to said sawing means for movement through said sawing means in a position determined by said sawing solution for each respective said flitch.

The sawing means may be an edger in which case the flitch positioning means angularly positions the flitch relative to the saws of the edger to define the direction of cut through the flitch or alternatively the sawing means may be a trimmer and the flitch positioning means will axially position (along the longitudinal axis of the flitch) one axial end of the flitch.

Preferably the data acquisition station will comprise a plurality of discreet groups of sensors that simultaneously measure the local densities of the flitch over different areas of the flitch so that the time required to acquire data representative of the density distribution can be accomplished in less time.

The density map preferably will be provided on the minimum number of image buffers dependent on the width of the flitch being processed so that if the data from more than one group of sensors can be placed in displaced relationship in the same image buffer, i.e. if more than twice the number of significant pixels for the width of flitch being sensed are available in a single image buffer more than one length of the flitch will be stored in an image buffer thereby reducing the time required for image analysis since the number of image buffers to be analyzed by the image analysis means is reduced accordingly.

The functions of data acquisition, density map formation, image analysis and sawing solution determination are carried out asynchronously and re reported to a control computer that controls the operator system in accordance with a flitch location and the status of the various functions to maximize the speed of the conveyor means.

BRIEF DESCRIPTION OF THE DRAWINGS

Further features, objects and advantages will be evident from the following detailed description of the preferred embodiments of the present invention taken in conjunction with the accompanying drawings in which:

FIG. 1 is a schematic side elevation of a processing system incorporating the present invention.

FIG. 2 is a schematic illustration of an array of electromagnetic radiation detectors positioned to intercept the line of radiation passing through the board.

FIG. 4 is a schematic illustration of a trimmer optimizing system incorporating the present invention.

DESCRIPTION OF THE PREFERRED EMBODIMENTS

Figure 3:
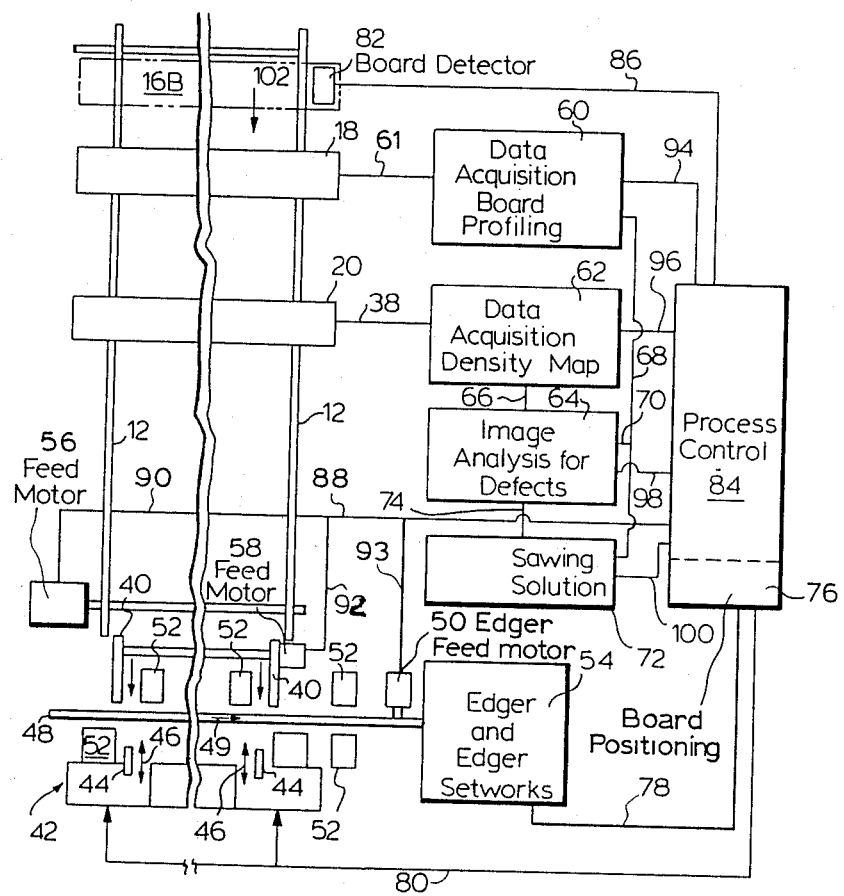
FIG. 3 is a schematic illustration of an edger optimizing system incorporating the present invention.

As shown in FIG. 1 the scanner 10 is composed of basic conveyor 12 which in the illustrated arrangement is a chain type conveyor with lugs 14 onto which the flitches or cants 16 are placed by a suitable means (not shown). The conveyor 12 moves the flitches 16 by engagement of the lugs 14 on one side of each flitch thereby automatically positioning the flitch relative to the conveyor so that the location of each flitch is known, with their spacing preset by the spacing between the lugs 14.

Conveyor 12 moves the flitches one at a time past a profiling station 18 (FIGS. 1 and 3) having a first sensor which may be any suitable sensor such as an optical scanner adapted to determine the wane and periphery of the board. Such devices are well known, for example the optical sensor sold by Lloyd/Softac of Vancouver, B.C. under the Tradename LS-8600.

After passing through the optical scanner or sensor 18 the flitch then passes into a data acquisition station 20 incorporating an x-ray scanner or a suitable density scanner that will determine the local densities through the flitch 16.

Preferably the density scanner will comprise at least one source 26 of x-ray that will be colimated by a colimator generally indicated at 22 to reduce the projected electromagnetic radiation into a flattened fan shape as illustrated at 24 to provide a narrow line of x-rays impinging on the flitch. In FIG. 2 four laterally spaced x-ray sources 26 are shown each projecting a line onto the flitch passing through the scanner 20. The lines from each source 26 are arranged substantially end to end in substantially axial alignment thereby to extend substantially the full length of the flitch. If desired the lines need not be axially aligned. The adjacent ends of these lines may overlap slightly, but if so the detectors 32 covered by the overlap will be calibrated accordingly. It is also possible to have small gaps between the adjacent ends of these lines emanating from adjacent emitters 26 which will leave undetected strips across the flitch, for example in the area of the conveyor chains 12.

Electromagnetic radiation is contained within a housing 28 of the scanner 20 by a lead lining and adjacent to the bottom edge, i.e. where the flitches pass therethrough, by a flexible lead lined curtains on the incoming and outcoming sides as indicated at 30. The curtain 30 are deflectable by the flitch entering and leaving the detector 20.

The fan shaped flow of photons 24 for each of the emitters 26 as above described forms a line of photons extending substantially the length of the flitch 16. The line is directed onto an array of side by side x-ray detectors 32 composed of a plurality of side by side scintillators 33 and corresponding photodiodes 34. These photodiodes 34 are each of essentially the same width and are arranged uniformly along the length of the line of photons. The width of these diodes is determined by the number of same positioned in side by side relationship along the length of the line of photons. Generally there will be at least 4 (four) such diodes per inch to obtain a usable image and normally not be more than about 16 (sixteen) since in normal practice reducing the width of the detectable areas beyond this will be of little practical advantage. Applicant has found the use of 10 diodes per inch provides a very satisfactory resolution.

In the FIG. 2 arrangement discreet diodes have been indicated by reference 34 (only some of the diodes indicated) and these diodes are connected by a printed circuit arrangement or the like to an analog to digital converter generally indicated 36 which in turn is connected to an output cables generally indicated at 38 to carry the digitized data collected by each group 35 of the array 32 to a suitable computer 62 as will be described below.

Each diode has a unique address and their voltage outputs are read and digitized sequentially in groups. Preferably the diodes will be sectioned into discrete groups as indicated at 35. In the illustrated arranged one group is provided for each emitter 26 but this is not essential. The diode outputs of each group 35 is read and digitized sequentially with all of the groups 35 being simultaneously read and digitized. By so dividing the diodes into groups along the line of radiation projected against the flitch the time required to accumulate the relevant data along the full length of the flitch is significantly reduced. For example if four discrete groups 35 are provided and the outputs of the diodes in each group are simultaneously read and digitized only one-quarter of the time necessary to sequentially read and digitize the output of the whole line is necessary (assuming each group 35 contain the equal number of diodes). Thus the diodes will be divided into a suitable number of groups to ensure that the required data is acquired in the available time. In a particular example of the present invention diode output is read and digitized sequentially in groups of 512 diodes at a rate of 100 kilohertz as the flitch traverses the sensors.

In the FIGS. 1 and 3 embodiment (edger optimizer) after the flitches are sensed or scanned by the scanner 20 they pass along the conveyor 12 over open section 39 and then onto second conveyor 40 (see FIGS. 1 and 3) which is driven in direction indicated by the arrow 41 and moves the flitch transferred from the conveyor 12 into the positioning station 42 wherein the leading edge of the flitch 16a in FIG. 1 is moved into position against adjustable stop pins 44 movable as indicated by the arrows 46 to align the leading edge of the flitch at the desired angle relative to the edger feed conveyor 48. The conveyor 48 is driven by edger feed motor 50. The plurality of rollers such as those schematically indicated at 52 are positioned at opposite sides of the conveyor 48 which is relatively narrow compared with the width of the flitch perpendicular to the direction of the travel of the conveyor 40 so that the flitch cannot tip as it is advanced by the conveyor 48. Generally a holddown (not shown) will cooperate with the top of each flitch as it is advanced into the edger 54.

The conveyor 12 transporting the flitches 16 through the two sensor stations 18 and 20 is driven by a suitable feed motor 56 while the advancing conveyor 40 is driven in the direction of arrow 41 by a feed motor 58.

The major data acquisition, analysis and control systems of the FIGS. 1 and 3 embodiment are schematically illustrated in FIG. 3.

In the embodiment illustrated in FIG. 3 the board or flitch surface profile is obtained from the profiling station 18 and fed to the profiling computer 60 via line 61, and data for density mapping is obtained in the data acquisition station 20 and fed to density mapping computer 62 via the communication line 38.

The image analysis computer 64 receives data from computer 62 via line 66 and from computer 60 via lines 68 and 70. The surface profile information from computer 60 is superimposed on the density map from computer 62 to enhance the accuracy of image analyses for defect classification.

The image analysis information which determines the location of defects including knots, rot and board dimensions, etc is then fed to the sawing solution computer 72 via line 74 and used to determine the sawing solution. The determination of the sawing solution also uses input from the computer 60 which is introduced via line 68.

The above data acquisition and computers are all operated asynchronously and their status reported to a main process control computer 84 which provides the overall control of the process. The process control computer 84 synchronizes the operation of all of the components of the system and has therefore input from the computers 62, 64 and 72 as well as from board detectors 82 (only one shown) detecting the presence of a flitch 16 being introduced into the equipment. Information from detector 82 is fed via line 86 into the process control computer 84. If desired there may be other detectors in other stations, for example, one in each of the stations 18 and 20, section 39, conveyor 40 and position 42.

Each of the computers 60, 62, 64 and 72 is connected to the process control computer 84 by the lines 94, 96, 98 and 100 respectively for transmitting data therebetween. The process computer 84 controls the operation of the various feed motors for the conveyor via line 88, main feed motor 56 of conveyor 12 is connected to line 88 via branch line 90, the feed motor 58 of conveyor 40 via branch line 92 and edger feed motor 50 via branch line 93.

The computer 84 includes computer capacity 76 for controlling the flitch positioner 42 based on input from the various computers including the sawing solution computer 72 and transmits the information for the sawing solution to the positioner 42 via line 80 and the edger setworks 54 via line 78.

In operation of the FIGS. 1 and 3 embodiment the first flitch or board 16 indicated at 16B in FIG. 3 is applied to the conveyor 12 at the infeed end thereof and moved perpendicular to its longitudinal direction in the direction of the arrow 102 first into the optical scanner 18 where its physical profile is scanned so that the wane edges of the flitch are sensed and their positions determined. The flitch is continuously fed through the scanner 18 at a feed rate determined by the feed motor 56 so that the dimensions and profile of the flitch are easily determined. The flitch is then passed at a similar feed rate through the data acquisition station or scanner 20 where x-rays are passed through the flitch and a density profile detected by the array of detectors 32 on a continuous basis as the flitch is moved there past.

The data acquired in the scanner 18 are transmitted by a line 61 to the data acquisition or profiling computer 60 wherein the profile of the flitch is determined. The information from the scanner 20 is transmitted via line 38 to the data acquisition and density mapping computer 62 wherein a density map of density profile of the scanned flitch is obtained. The density profile is based on the signal intensity per pixel of the image generated which in turn is determined by the signal attenuation of the x-rays passing through the board and being received in a given time period by each of the various detectors of the array 32. Normally the signal will be inverted so that the areas of greatest density will appear in the image as the area of highest grey scale intensity for image analysis.

The image analysis time may be significantly reduced if the images from more than one scan length (equal to the number of pixels across a standard image buffer) can be incorporated onto a single image buffer. This may be accomplished using the information from the wane scanner 18 which determines the maximum width of the board so if the number of pixels across this maximum width is less than ½ (one-half) the number of pixels in the height of an image buffer two scan lengths will be incorporated in the same buffer. If the number of pixels across the maximum width of the flitch is less than ⅓ (one-third) the number of pixels in the height of a buffer, three scan lengths may be incorporated in a single buffer, and so on.

By packing more than one scan length in a single image buffer the processing time for analyzing all of the images is reduced. The number of buffers that must be analyzed and processed may well be reduced to in many cases ½ (one-half) and in some cases to ⅓ (one-third) thereby reducing the analysis time so that the feed speed (conveyor 12) may be increased.

A histogram of the resultant intensities of the pixels of the grey scale image (sensed densities) is produced by accumulating histograms buffer by buffer and the computer 64 analyzes the cumulated histogram for the intensities (densities) corresponding to good wood density, rot density and low density depicting voids such as holes or dry rot. For example, if relatively dry wood is being processed the density of rot is significantly less than that of good wood and it will be determined on the basis of this lower density, however, in wet wood (i.e. wet wood may have been transported by water) the density of the rot may well be higher than the density of the good wood and the particular density spectrum depicting rot will be higher than that of good wood.

High density areas may also be found by analyzing the frequency information in the image.

Applicant has found that knots may be determined by sudden changes of density, i.e. a relatively sharp interface between the high density knot area and the lower density of a good wood area. It has been found that knots can be recognized in this manner by using a one-dimensional $\nabla^2$-G digital filter having its one dimension substantially parallel to the longitudinal axis of the flitch to determine the sudden changes in density as the scan enters and leaves the knot. This technique has been found to accurately detect knots quickly without requiring undue computing capacity.

In any event data is analyzed to determine which pixels represent knots, which pixels represent good wood and which pixels represent rot. The relative locations of these pixels are known so that the location of rot and knots in the board are determined.

Based on this information plus the information acquired in the detector 18 and processed in the computer 60 which determines the outer edges and the wane of the flitch all of the defects adjacent to the edge of the flitch may be eliminated and the operation of the computer 64 simplified since the outline of the board is determined by computer 60.

The information from the computer 64 and the information from the computer 60 above described are fed to the sawing solution computer 72 which based on the current values for lumber by-grade products is programmed to optimize the value of the material that may be cut from the flitch by grade and volume so the resultant sawing operation will provide a maximum return. The computer 72 supplies the sawing solution to computer 84 which positions the edger saws of the edger via the edger setworks 54 and computes in the computing section 76 the position of the pins 44 and commands the movement of the pins 44 in the positioner 42 accordingly.

The main or controlling computer 84 controls the operations and speed of the system. Each of the computers 60, 62, 64 and 72 feed information to the controlling computer 84 and signal the computer 84 when they have completed their tasks for each flitch as it is passed through the system. The speed of conveyor 12 is governed by motor 56 which is controlled by computer 84 to normally move at maximum speed to move that flitch through the system into the edger 54 as quickly as possible and pass the following flitchs into the system. If the computations of the computers are not completed for a given flitch when that flitch approaches the conveyor 40 the computer 84 slows the speed of or stops conveyor 12 until all operations for that flitch are completed and then speeds up the conveyor 12. This ensures that the line is operated at maximum speed unless an unduly complex operation requiring significantly more time than the average is encountered. If this occurs the line speed (conveyor 12) is slowed or stopped depending on the particular control use.

The flitch 16B when it enters the positioner 42 has been completely analyzed by the computers 60, 62, 64 and 72 and the angle of the flitch to the infeed conveyor 48 has been determined. To position the flitch in the proper orientation the pins 44 (only two shown but more may be used depending on the length of the flitch to be positioned) are adjusted as indicated by the arrows 46 and the flitch is advanced into the positioner 42 by the conveyors 40 driven by motor 58 which is activated when a flitch is in position to move the edge of the flitch against the pins. Conveyor 40 may be simply flat belt type conveyor that can slip relative to the flitch so that when the conveyor 40 pushes the flitch against the most forwardly projecting one of the pins 44 that end of the flitch slides on the conveyor and the flitch is skewed to properly orient its longitudinal axis with the direction of travel of the conveyor 48 to the edger 54 as indicated by the arrow 49.

When the edge of flitch has been positioned against the stops 44 the edger feed motor (50) is activated to move the flitch in the direction of the arrow 49 through the edger 54 to saw the flitch as required.

The above description has been directed to edger system however it may equally well be applied to a trimming system such as that shown in FIG. 4.

In FIG. 4 like references numerals have been utilized to indicate like parts of the invention described herein above and these elements will not be described again.

It will be noted that in the FIG. 4 embodiment no profile scanner 18 has been incorporated. In this case the data generated by the scanner 20 is conveyed via a line 61A to a data acquisition and board profile computer 60A which determines the edge of the board based on a significant change in density generated when the edge of the board traverses the line of radiation and a peak in density that is formed substantially along the line formed where the edge of the wane intersects the plane forming one surface of the flitch. The computer 60A thus determines the location of the edge of the flitch as well as the line of intersection of the wane with the board or flitch surface. This technique of defining edges of the wane surfaces on the flitch cannot determine the slope of the wane edge-as can be done with an optical sensor such as that shown in FIG. 1 and 3 (sensor 18) thus while the sensor 18 may be eliminated and the board profile determined as described immediately hereinabove described using the computer 60A, it is preferred to utilize an optical scanning system using the optical scanner 18 and the computer 60 as this will permit more accurate determination of a sawing solution, e.g. if the slope of the wane is relatively shallow adjacent its intersection with the planar surface of the flitch it may be acceptable to include more of the wane edge in the cut boards.

The optical scanner 18 and computer 60 may be used in FIG. 4 embodiment in place of the computer 60A or in the FIG. 3 embodiment the computer 60A may be used in place of the optical scanner 18 and computer 60.

In the FIG. 4 embodiment the conveyor 12 empties onto an infeed conveyor 200 that carries the flitch (hereinafter referred to as board) into the trimmer 202 having setworks 204. Thus in the FIG. 4 embodiment boards will be applied to the conveyor 12 and sensed by the sensor 20 in a similar manner to the flitches fed to the conveyor 12 of the FIG. 3 embodiment.

The boards travelling through the sensing station 20 and along conveyor 12 are sensed and the sawing solution determined in essentially the same manner as described above in FIG. 3. This information is all fed through the process control computer 84.

The board positioning computing capacity 76A in this case is utilized to control via line 206. The position of end plate 208 which may be moved in and out as indicated by the arrow 210 and to control the operation of the positioning motor 212 via line 214. The positioning motor 212 drives the interconnected rollers 216 to force the lateral end edge at one longitudinal end of a board positioned on rollers 216 into a butting relationship with the plate 208 and thereby position one end of the board.

Simply stated once the sawing solution is known it is necessary to position the board longtitudinally relative to the trimmer 202 and to set the trimmer setworks 204 according to the sawing solution which is accomplished by the process control computer 84 and its connecting line 218.

The trimmer conveyor 200 is driven by a feed motor 220 which is controlled from the process computer 84 via line 88 and branch line 222.

In the operation of the system shown FIG. 4 once the sawing solution has been delivered to process controller 84 and the board on the conveyor 200 is moved to a position overlying the rollers 216. Plate 208 will normally have been positioned by the board positioning computer section 76A before the board reaches the conveyor rollers 216. With the plate 208 positioned as required the rollers 216 are activated by the positioning motor 212 to move the board in the direction of the arrow 224 and butt its end edge against the plate 208.

Conveyor 200 moves the board into the trimmer which has had its setworks 204 adjusted so that the saws cut the board to length(s) as required.

While a single conveyor 200 has been shown it will be apparent that two separate conveyors may be used one to deliver the board to the positioning station incorporating the rollers 216 and the plate 208 and a second conveyor dependently operated used to convey the boards through the trimmers 202.

The invention has been described with the flitch being fed substantially perpendicular to its longitudinal axis, but it will be apparent that with suitable modification the flitches may be fed through the sensing equipment with the longitudinal axis substantially parallel to the direction of feed.

Having described the invention modifications will be evident to those skilled in the art without departing from the spirit of the invention as defined in the appended claims.

I claim:

1. A lumber optimizer system comprising a conveyor means for transporting flitches on a path of travel through said system, a profiling station having optical sensing means to generate a signal defining the profile of each said flitch as each said flitch is transported through said profiling station by said conveyor means, a data acquisition station having means for directing a line of X-rays extending substantially across said path and from one side to an opposite side of each said flitch as said flitch traverses said line, said x-rays passing through each said flitch as each said flitch is moved through said data acquisition station by said conveyor means and discrete side by side means for locally sensing the amount of said x-rays passing through each said flitch along said line thereby to provide data indicating the densities of local areas of each said flitch along said line, means forming a density map of said densities of substantially all said local areas of each said flitch from said data, image analysis means to analyze said density map to discriminate defects including knots in said flitch and to determine the size and location of said defects in said flitch, means for to determine a sawing solution based on size and location of said defects in said flitch as determined by said image analysis means, and on said signal defining the profile of each said flitch from said optical sensing means, a sawing means, means to adjust said sawing means in accordance with said sawing solution so generated for each said flitch, a flitch positioning means, and means to adjust said flitch positioning means to orient each said flitch relative to said sawing means as determined by said sawing solution for each respective said flitch.

2. A lumber optimizer as defined in claim 1 further comprising a control computer mean controlling the operation of said conveyor in accordance with the operations of said image analysis means and said means for determining a sawing solution.

3. An optimizer system as defined in claim 2 wherein said data acquisition station said means forming a density map said image analysis means and said means for determining said sawing solution are operated asynchronously and completion of operation of each said means operated asynchronously is transmitted to said control computer, said control computer controlling the operation of said conveyor means in the event that one of said means operated asynchronously does not transmit notification of completion of its task to said control computer to ensure that a flitch does not pass into said sawing means until its sawing solution has been determined, said means to adjust said flitch positioning means has adjusted the position of said positioning means and said means to adjust said sawing means has adjusted said sawing means.

4. A lumber optimizer as defined in claim 1 wherein said sawing means comprises an edger and wherein said positioning means includes means to angularly adjust the longitudinal axis of said flitch relative to said edger to determine the angle of the direction of cut by said edger to the longitudinal axis of said flitch.

5. A lumber optimizer as defined in claim 1 wherein said sawing means comprises a trimmer and wherein said positioning means comprises means to position one longitudinal end of said flitch.

6. A lumber optimizer as defined in claim 1 wherein said means to generate a signal comprises of computer means to analyze said density map to determine the longitudinal edges of said flitch and at the junction of the wane portion of each said flitch with an adjacent planar surface of said flitch.

7. A lumber optimizer as defined in claim 1 wherein said conveyor means conveys said flitches through said data acquisition station with the longitudinal axis of each of said flitches substantially parallel to said line of radiation and said means for locally sensing the amount of radiation passing through the said flitch along said line is divided into a plurality of discrete groups each composed of a plurality of side by side sensors, arranged along said line on the opposite side of said flitch to said means for directing each said group operating in parallel with adjacent said groups and each said sensor in each of said groups operating in sequence with other sensors in its respective group to provide data indicating the density of spaced locations in said flitch substantially simultaneously.

8. A lumber optimizer as defined in claim 7 wherein said data indicating the densities of said local areas are accumulated in separate image buffers for analysis by said image analysis means.

9. A lumber optimizer as defined in claim 8 wherein data from a plurality of said groups representing spaced areas on said flitch is accumulated on a single image buffers provided the width of said flitch is represented in said image buffers by less than half of the pixels in the height of one of said image buffers.

10. A lumber optimizer as defined in claim 1 wherein said conveyor means conveys each said flitch substantially perpendicular to its longitudinal axis through siad stations and into said positioning means and said longitudinal axis and said line of radiation are parallel.

11. A lumber optimizer as defined in claim 2 wherein said conveyor means conveys each said flitch substantially perpendicular to its longitudinal axis through siad stations and into said positioning means and said longitudinal axis and said line of radiation are parallel.

12. A lumber optimizer system as defined in claim 1 further comprising means to produce a histogram of said data of said local densities for local areas versus frequency of occurrence and wherein said analyzing means analyzes said density map and said histogram to discriminate between types of said defects.

13. A lumber optimizer as defined in claim 1 wherein said image analysis means include a one-dimensional $\nabla^2$-G digital filter having its one-dimension extending substantially parallel to the longitudinal axis of said flitch is used to define boundary edges of knots.

14. A method of discriminating knots from other portions of a flitch comprising passing x-rays through said flitch and locally sensing the intensity of said x-rays after passing through said flitch to produce a density map of said flitch wherein the locally sensed densities of said flitch designate local density points on said map, analyzing said density map using a one-dimensional $\nabla^2$-G digital filter having its one-dimension extending substantially parallel to the longitudinal axis of said flitch to determine sudden changes in density indicating boundary edges of knots.

* * * * *